(12) United States Patent
Nepil (10) Patent No.: US 8,479,407 B2
(45) Date of Patent: Jul. 9, 2013

(54) DISTANCE MEASURING WHEEL WITH FOOT ACTUATED RESET

(75) Inventor: Mark Nepil, St. Charles, IL (US)

(73) Assignee: Keson Industries, Inc., Aurora, IL (US)

( * ) Notice: Subject to any disclaimer, the term of this patent is extended or adjusted under 35 U.S.C. 154(b) by 108 days.

(21) Appl. No.: 13/217,954

(22) Filed: Aug. 25, 2011

(65) Prior Publication Data

US 2012/0102772 A1 May 3, 2012

(51) Int. Cl.
*G01B 3/12* (2006.01)

(52) U.S. Cl.
USPC ............................................. 33/781; 33/772

(58) Field of Classification Search
USPC .................. 33/772, 773, 774, 775, 776, 777, 33/778, 779, 780, 781, 782
See application file for complete search history.

(56) References Cited

U.S. PATENT DOCUMENTS

| 5,255,561 | A * | 10/1993 | Fleming et al. | 33/521 |
| 8,082,676 | B2 * | 12/2011 | Tang | 33/772 |
| 2009/0217542 | A1 * | 9/2009 | Watkins | 33/775 |
| 2012/0102772 | A1 * | 5/2012 | Nepil | 33/701 |

* cited by examiner

*Primary Examiner* — Yaritza Guadalupe-McCall
(74) *Attorney, Agent, or Firm* — Wood, Phillips, Katz, Clark & Mortimer (57) ABSTRACT

A distance measuring device having a frame defining an operating handle. At least one wheel is mounted to the frame. A counter mechanism on the frame has a display and a reset mechanism. An actuating mechanism has components cooperating between the at least one wheel and counter mechanism for causing cumulative distance measurements to be identified on the display as the at least one wheel is rolled against an underlying surface. The counter mechanism has a reset actuator that is moved from a retracted position into an actuated position. The reset actuator has a surface with an engaging area. The distance measuring device further has at least one stop component that defines a blocking surface to arrest movement of a component, having an area that is greater than the engaging area, that is pressed against the surface of the reset actuator to thereby move the reset actuator from the retracted position into the actuated position.

21 Claims, 5 Drawing Sheets

DISTANCE MEASURING WHEEL WITH FOOT ACTUATED RESET

BACKGROUND OF THE INVENTION

1. Field of the Invention

This invention relates to distance measuring wheels and, more particularly, to a distance measuring wheel having a manually resettable counter mechanism.

2. Background Art

Distance measuring wheels abound and are used by different trades for both indoor and outdoor applications. In a typical construction, a frame defines an operating handle and a support for a wheel and a counter mechanism. As the wheel is turned relative to the frame by being rolled against an underlying surface, one or more actuators, that move with the wheel, trigger the counter so as to register distance increments that accumulate and are identifiable on a display on the counter mechanism. Once a measurement has been completed, a reset actuator can be repositioned to "zero" the counter preparatory to taking another measurement. Commonly, the reset actuator is in the form of a depressable button that is designed to be engaged and repositioned as by the user's thumb or finger.

In outdoor applications, typically the measured distances are quite long and limited in number. For example, with road construction projects, the distances to be measured may typically be several hundred feet. Once the distance has been measured by the user, he/she will typically pick the unit up to allow convenient manipulation of the reset actuator.

With indoor applications as, for example, when measuring for carpet installation, the user may be required to take a significant number of relatively short measurements. To avoid having to elevate the unit each time to access the reset actuator, users commonly take the shortcut of using a foot to reposition the reset actuator. Since the reset actuators are not designed for foot actuation, a number of potential problems arise.

First of all, foot actuation may cause only part of the requisite movement of the reset actuator to completely "zero" the counter. Since the objective of the user is to avoid having to elevate the entire unit during resetting of the counter, it may be difficult or impossible for the user to visually read the counter display and recognize that it has not been fully reset. As a result, inaccurate subsequent measurements may be taken. The inaccuracies in the measurements may be small enough that the user does not identify the error, as a result of which areal estimates may be significantly inaccurate.

Further, since the reset actuator is not intended to be foot operated, it is commonly placed at a location on these units wherein placement of a foot against the actuator is obstructed by other structure. One or more wheels on the frame and/or part of the frame itself may obstruct movement of the user's foot towards the reset actuator as would allow it to be repositioned to "zero" the counter. The user may have to awkwardly position the foot to permit the desired access which makes foot operation of the reset actuator inconvenient. Again, this contributes to the problem of potentially only partially moving the reset actuator through the range necessary to "zero" the counter.

A still further problem results when a user attempts to avoid the above noted problems. Specifically, to assure a complete "zeroing" of the counter, the user may apply pressure through his/her foot that is excessive to the point that the counter mechanism and/or some other part of the unit may be damaged. This problem is aggravated particularly by the conventional use of relatively small reset actuators and location of the same wherein access by a user's foot is obstructed. To assure that the reset actuator is depressed as to a flush position, a user may exert an even greater pressure than is believed necessary to "zero" the counter, to thereby assure that complete resetting occurs.

Heretofore, those using conventional distance measuring wheels have contended with the problems of either: a) having to elevate the unit after each completed measurement to reset with a finger or thumb; or b) risk that "zeroing" of the counter mechanism has been incomplete through foot actuation. No viable commercial structure is known that will allow convenient foot operation of a reset actuator to consistently "zero" a counter while at the same time being operable in a manner whereby the application of force by a user's foot is not likely to damage the counter or any other component on the unit. The industry continues to seek out structures that permit accurate measurements to be taken while affording even greater user convenience in operation.

SUMMARY OF THE INVENTION

In one form, the invention is directed to a distance measuring device having: a frame defining an operating handle; at least one wheel mounted to the frame for turning around an axis; a counter mechanism on the frame with a display and comprising a reset mechanism; and an actuating mechanism having components cooperating between the at least one wheel and counter mechanism for causing cumulative distance measurements to be identified on the display as an incident of the at least one wheel being rolled against an underlying surface upon which a distance measurement is being taken. The counter mechanism has a reset actuator that is moved from a retracted position into an actuated position through the application of a force thereon as by a user's foot to thereby reset the counter mechanism. The reset actuator has a surface with an engaging area upon which a force is applied to change the reset mechanism from the retracted position into the actuated position. The distance measuring device further has at least one stop component that defines a blocking surface to arrest movement of a component such as a user's foot, having an area that is greater than the engaging area, that is pressed against the surface of the reset actuator to thereby move the reset actuator from the retracted position into the actuated position.

In one form, the at least one wheel defines the at least one stop component.

In one form, the distance measuring device has a first surface that the surface of the reset actuator is moved towards and away from as the reset actuator is moved respectively towards the actuated position and towards the retracted position and with the reset actuator in the actuated position the surface of the reset actuator is spaced away from the first surface.

In one form, the first surface is defined by a discrete projection.

In one form, the first surface extends substantially fully around the surface of the reset actuator with the reset actuator in the actuated position.

In one form, the at least one stop component includes a projection with a free end defining the blocking surface.

In one form, the distance measuring device includes a discrete projection with a free end defining the first surface.

In one form, the discrete projection guides movement of the reset actuator between the retracted and actuated positions.

In one form, there is a gap between the surface of the reset actuator and the one wheel that is bridged as by a user's foot applying a force to the reset actuator to move the reset actuator from the retracted position into the actuated position and the one wheel defines the at least one stop component.

In one form, the reset actuator is translatable in a vertical line with the distance measuring device in an upright orientation.

In one form, the at least one wheel consists of first and second wheels between which the counter mechanism is located.

In one form, the reset actuator is movable in a line between the retracted and actuated positions, the at least one wheel defines the at least one stop component and the blocking surface on the at least one wheel and first surface reside in planes orthogonal to the line that are spaced by no more than ½ inch.

In one form, the reset actuator is movable in a first line between the retracted and actuated positions and the reset actuator is keyed within the discrete projection to limit relative movement between the reset actuator and discrete projection around the line.

In one form, the counter mechanism has a housing and there is a single piece that defines a part of the housing including the discrete projection.

In one form, the engaging area on the reset actuator surface has at least one dimension on the order of ½ inch.

In one form, the operating handle has an elongate body with an end that is anchored to the single piece.

The invention is further directed to a distance measuring device having: a frame defining an operating handle; at least one wheel mounted to the frame for turning around an axis; a counter mechanism on the frame with a display and comprising a reset mechanism; and an actuating mechanism having components cooperating between the at least one wheel and counter mechanism for causing cumulative distance measurements to be identified on the display as an incident of the at least one wheel being rolled against an underlying surface upon which a distance measurement is being taken. The counter mechanism has a reset actuator that is moved from a retracted position into an actuated position through the application of a force thereon as by a user's foot to thereby reset the counter mechanism. The reset actuator has a surface with an engaging area upon which a force is applied to change the reset mechanism from the retracted position into the actuated position. The distance measuring device further has a first surface that the surface of the reset actuator is moved towards and away from as the reset actuator is moved respectively towards the actuated position and towards the retracted position. With the reset actuator in the actuated position, the surface of the reset actuator is spaced away from the first surface.

In one form, the first surface is defined by a discrete projection.

In one form, the discrete projection guides movement of the reset actuator between the retracted and actuated positions.

In one form, the distance measuring device further includes at least one stop component that defines a blocking surface to arrest movement of a component such as a user's foot having an area that is greater than the engaging area that is pressed against the surface of the reset actuator to thereby move the reset actuator from the retracted position into the actuated position.

The invention is further directed to a method of taking distance measurements on a surface. The method includes the steps of: obtaining a distance measuring device; placing the at least one wheel against the surface; through the operating handle rolling the wheel against the surface to take a first distance measurement that is displayed on the counter mechanism; and after taking the first distance measurement and with the at least one wheel against the surface, using a foot to apply a pressure against the reset actuator that changes the reset actuator from the retracted position into the actuated position to thereby reset the counter mechanism to allow another measurement to be taken.

DETAILED DESCRIPTION OF THE PREFERRED EMBODIMENT

Figure 1:
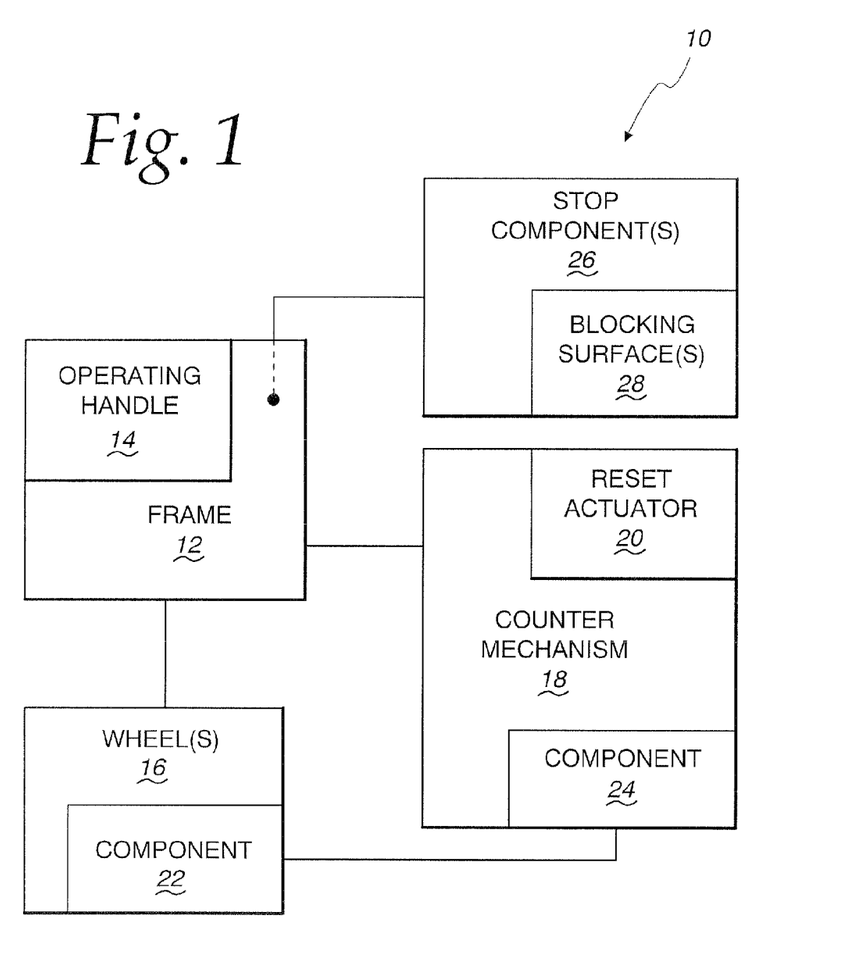
FIG. 1 is a schematic representation of a distance measuring device, according to the present invention.

In FIG. 1, a schematic representation of a distance measuring device, according to the present invention, is shown at 10. The device 10 is shown in schematic form because the majority of the components can vary widely in construction and operation, without departing from the invention herein. The schematic depiction is intended to encompass these variations.

The device 10 consists of a frame 12 defining an operating handle 14. The operating handle 14 may have any configuration that allows the user to engage the same to controllably reposition the device 10 in operation.

At least one wheel 16 is mounted to the frame 12. Each wheel 16 is capable of being turned round an axis as the device 10 is advanced during operation thereof by rolling the wheel(s) 16 against a surface upon which a distance is to be measured.

A counter mechanism 18 is provided on the frame 12 and has a conventional type display for measured distances. The counter mechanism 18 has a reset mechanism with a reset actuator 20 that is moved from a retracted position into an actuated position to thereby reset/zero the counter mechanism 18.

An actuating mechanism consists of components 22, 24 on at least one of the wheels 16 and the counter mechanism 18 that cooperate to cause cumulative distance measurements to be identified on the counter mechanism display as an incident of the at least one wheel 16 being rolled against an underlying surface against which a distance measurement is being taken. The structural details of the actuating mechanism are not critical to the present invention as myriad mechanisms, mechanical, electrical, and/or electromechanical in form currently exist for translating wheel rotation into a displayable distance traveled by the wheels 16.

The device 10 further has at least one stop component 26 that defines one or more blocking surfaces 28 to arrest movement of a component, such as a user's foot, that engages the reset actuator 20 to effect movement thereof between the retracted position and the actuated position. The reset actuator 20 has an engaging area upon which a force is applied to reposition the reset actuator 20. The force applying component, in the event that it is a user's foot, has an area greater than the engaging area that it is pressed against. The extended area of the force applying component thus simultaneously contacts the engaging area of the reset actuator 20 and the blocking surface 28 on the stop component 26 with the reset actuator 20 changed to its actuated position.

The stop component(s) 26 may be attached to the frame 12, or be considered part of the frame, as indicated by the dotted lines in FIG. 1. For purposes of the description and claims herein, there will be no distinction recognized between whether the stop component(s) 26 is attached to or part of the frame 12.

Referring now to FIGS. 2-6, one specific form of a device, shown schematically in FIG. 1, is depicted. The device 10 shown in these Figures has a frame 12 with an integrated counter mechanism 18 having an upwardly facing display 30 that will typically have a numeric representation of a measured distance.

Figure 2:
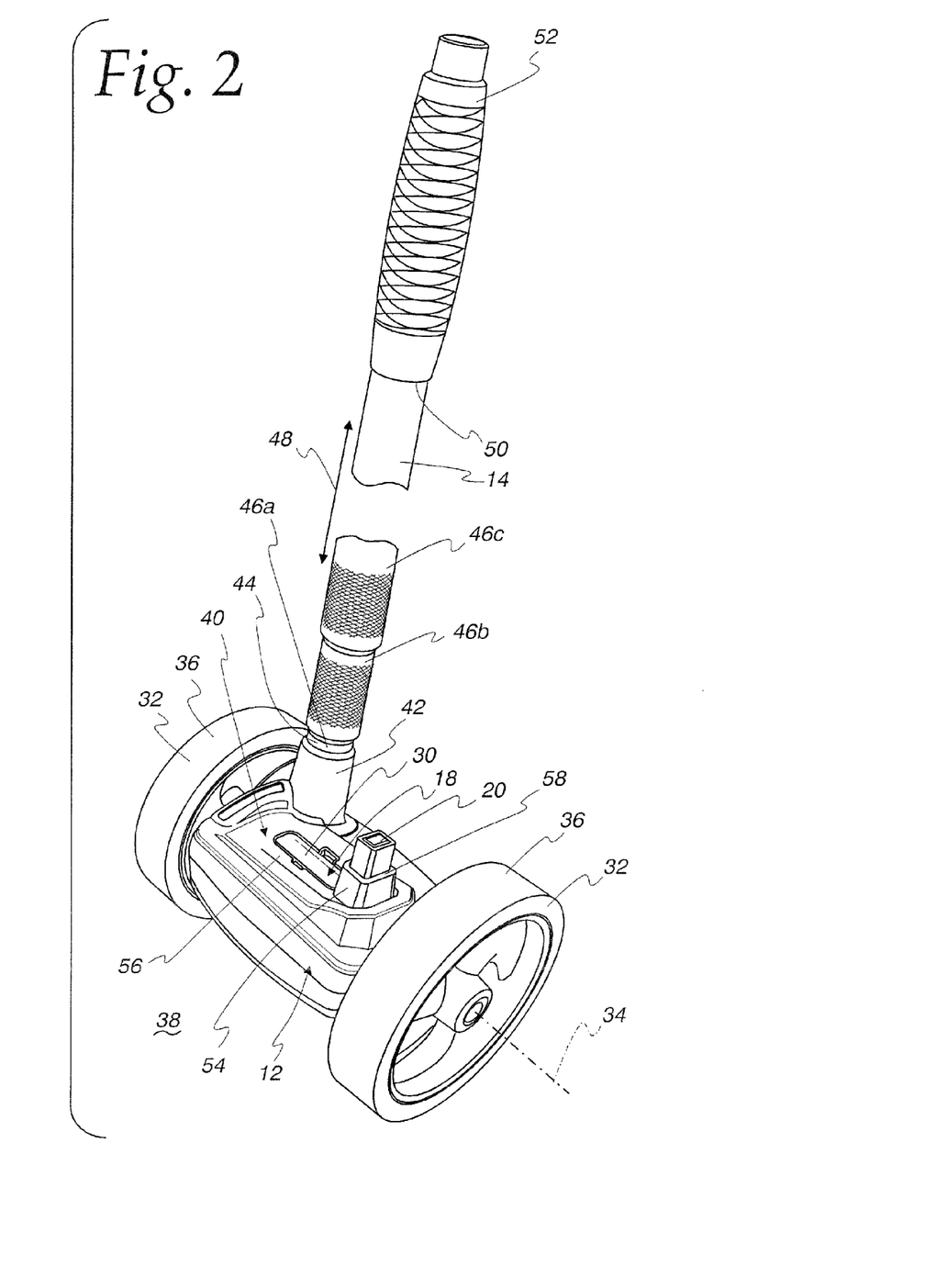
FIG. 2 is a perspective view of one particular form of device as shown in FIG. 1.
Figure 3:
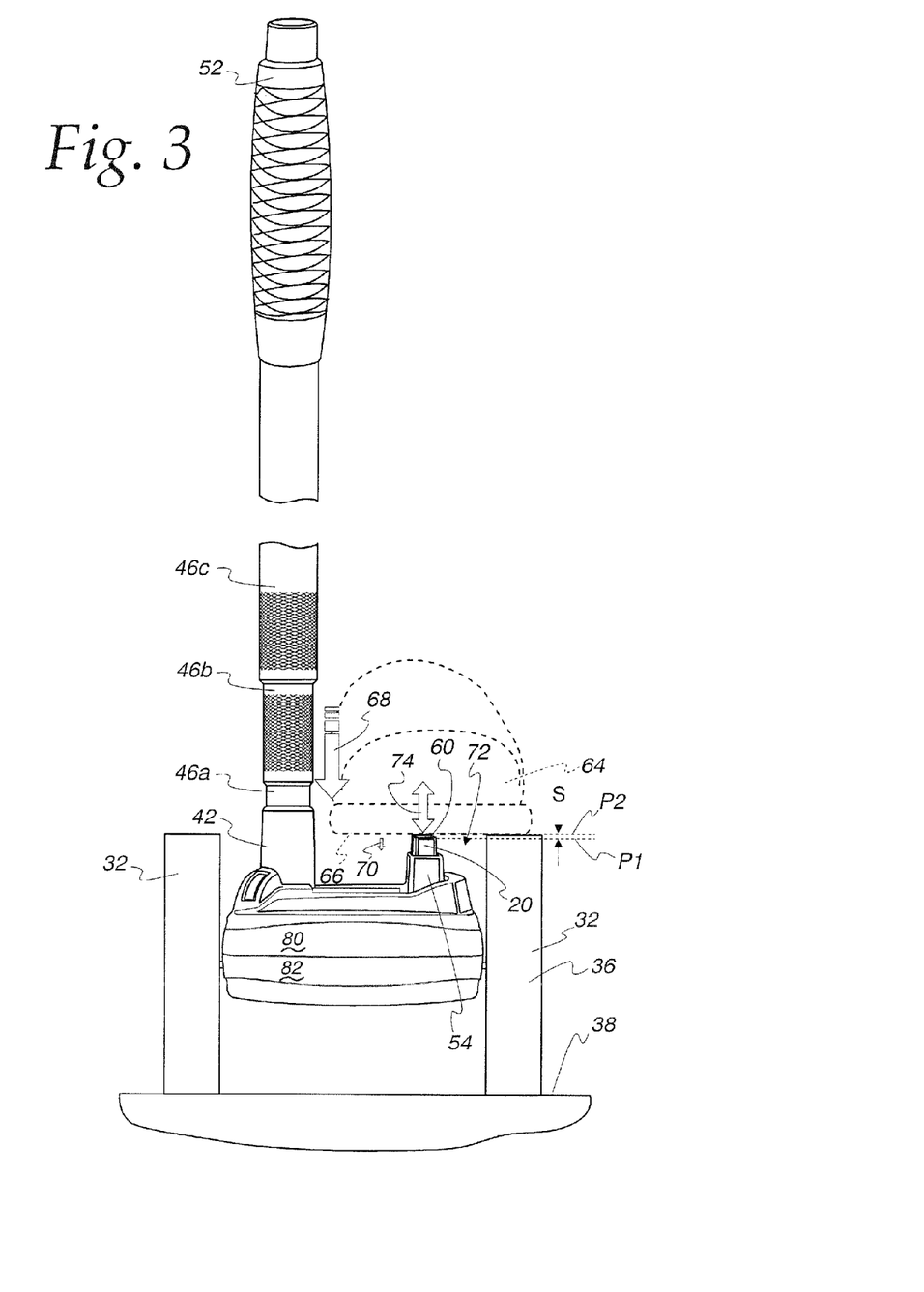
FIG. 3 is a front elevation view of the device in FIG. 2 and showing a user's foot exerting a force on a reset actuator to reset a counter mechanism.
Figure 4:
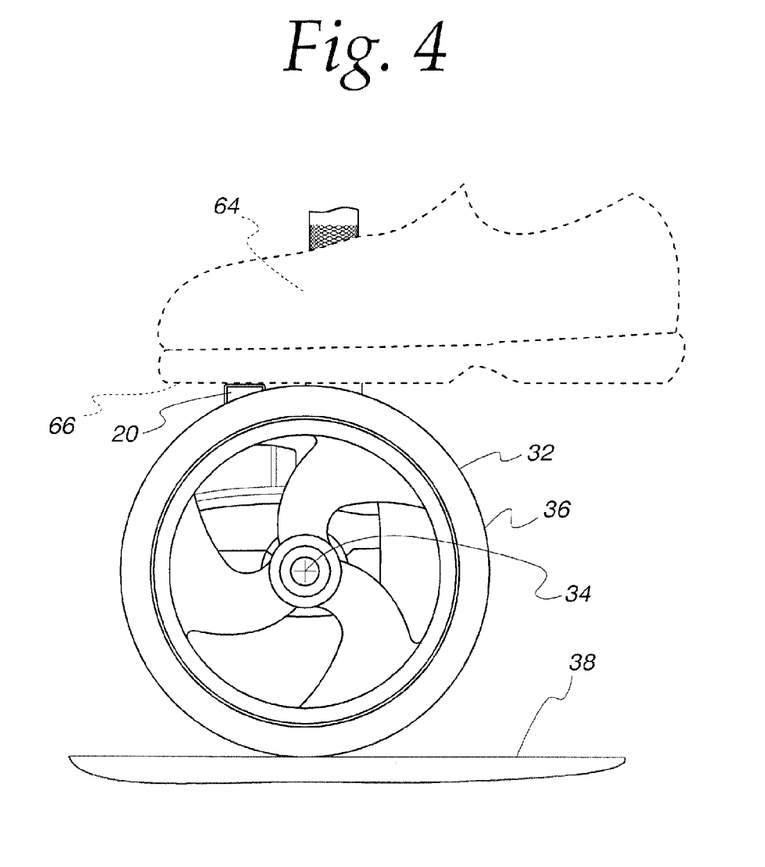
FIG. 4 is a fragmentary, side elevation view of the device in FIGS. 2 and 3 with the user's foot placed thereon as in FIG. 3.

The frame 12 in this embodiment is supported by laterally spaced wheels 32 that are mounted to the frame 12 to rotate about a common, laterally extending axis 34. The wheels 32 rotate as one piece around the axis 34. The wheels 32 have peripheral surfaces 36 that bear, and roll, against an underlying surface 38 upon which a distance measurement is to be taken. The surfaces 36 are preferably made from a material that will roll smoothly against the surface 38 without slippage so that accurate measurement readings can be consistently taken.

The frame 12 has a housing 40 with an integrally formed boss 42 that accepts the distal end 44 of an elongate operating handle 14 to effect a fixed anchoring thereof. In this embodiment, the operating handle 14 has an elongate body made up of three telescopingly engaged, elongate sections 46a, 46b, 46c of conventional construction that allow the length of the operating handle 14, as indicated by the double-headed arrow 48, to be selected and releasably held.

At the proximal end 50 of the operating handle 14, a soft grip 52 is applied to allow comfortable grasping of the operating handle 14 to thereby facilitate repositioning of the device 10 as the device 10 is either being used or transported.

As noted above, it is not necessary to explain details of how the counter mechanism 18 operates, nor is it necessary to understand precisely how the counter mechanism 18 is reset/zeroed. The present invention is focused principally on the reset actuator 12 and its relationship with other components on the device 10.

Figure 5:
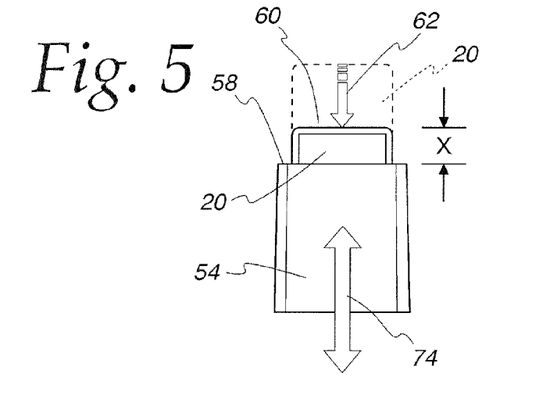
FIG. 5 is an enlarged, fragmentary, elevation view of a projection which guidingly receives the reset actuator shown in retracted and actuated positions, respectively in dotted lines and solid lines in FIG. 5.

In this embodiment, the frame housing 40 has a discrete projection 54 that cantilevers upwardly from a top, upwardly facing wall surface 56 on the housing 40 at which the display 30 is located. The projection 54 has a first surface 58, in this case at an upper free end of the projection 54. As the reset actuator 20 is changed from a retracted position, as shown in FIG. 5 in dotted lines, into an actuated position, as shown in solid lines in FIG. 5, by application of a force to a surface 60 at the top of the reset actuator 20, as indicated by the arrow 62, the surface 60 on the reset actuator 20 moves towards the first surface 58.

More specifically, as the reset actuator 20 is moved from the retracted position into the actuated position therefor, a surface 60 moves towards the first surface 58 but remains spaced a distance X therefrom that may be on the order of one-quarter inch. The distance X may be less than or greater than one-quarter inch and is provided to allow a force application to positively place the reset actuator 20 in the actuated position, whereas a flush arrangement between the surfaces 60, 58 might not consistently allow this end to be achieved.

In this embodiment, the wheel 32 acts as the aforementioned stop component 26, with the surface 36 thereon functioning as the blocking surface 28. The components on the device 10 are configured so that a user can conveniently reposition the reset actuator 20 to reset the counter mechanism through his/her shoed foot 64. The bottom surface 66 of the foot 64 is pressed downwardly against the surface 60 on the reset actuator 20 which resides slightly above the peripheral surface 36 of the wheel 32 with the reset actuator 20 in the retracted position and the device 10 in the upright orientation shown in FIG. 3. By pressing down with the foot 64, as indicated by the arrow 68, the bottom foot surface 66 depresses the reset actuator 20, as indicated by the arrow 70, fully to the actuated position of FIGS. 3 and 5. With the foot 64 in this orientation, the bottom foot surface 66 engages the peripheral surface 36 of the wheel 32 which performs the blocking function, previously described.

More specifically, the bottom surface 66 of the foot 64 bridges a gap 72 between the reset actuator 20 and wheel 32 and is thus stably supported cooperatively by the surfaces 60, 36. This arrangement allows the forces produced by the user's foot 64 to be borne primarily by the wheel 36 while at the same time repositioning the reset actuator 20 positively from the retracted position into the actuated position therefor. By causing the wheel 36 to bear part of the applied force, the force applied through the user's foot 64 to the reset actuator 20 is not likely to be excessive as might damage the reset actuator 20 and/or the components cooperating therebetween and the remainder of the counter mechanism 18.

In this embodiment, the reset actuator 20 moves in a substantially straight line between the retracted and actuated positions therefor, as indicated by the arrow 74 in FIG. 5. With the device in the upright orientation wherein the length of the handle 14 is substantially vertical, the line 74 is likewise vertical in direction.

In this embodiment, planes P1, P2, orthogonal to the line of movement of the reset actuator 20 and coinciding respectively with the reset actuator surface 60 and top of the blocking/peripheral surface 36, are spaced slightly from each other, with the latter slightly above the former. The planes P1, P2, might be substantially coincident or have a reversed spacing. In the embodiment shown, the spacing between the planes P1, P2, indicated by S in FIG. 3, is on the order of one-eighth inch. The spacing S could be greater than one-eighth inch but is preferably no greater than one-half inch.

Figure 6:
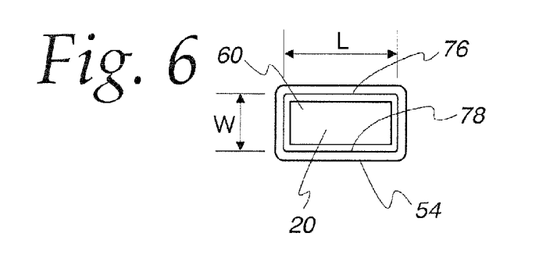
FIG. 6 is a plan view of the reset actuator and projection in FIG. 5.

To avoid skewing of the reset actuator 20 as it is moved, the reset actuator 20 is keyed within the projection 54. More specifically, in this embodiment, the perimeter 76 of the reset actuator 20 has a squared/rectangular shape that is nominally matched to a vertical bore 78 through the projection 54. Other shapes that allow keying are contemplated. Virtually any non-round complementary shapes for a cooperating perimeter 76 and bore 78 might be utilized to limit relative movement between the reset actuator 20 and projection 54 around the line 74.

To further allow for positive movement of the reset actuator 20 without skewing, the surface 60 thereon may be made with a substantial cross-sectional area. In this embodiment, the surface 60 has a length L on the order of one-half inch, with a width W on the order of one-quarter inch. Other shapes and dimensions are contemplated to present a substantial area for the surface 60 to facilitate positive operation thereof as through the user's foot 64.

To facilitate manufacture and to provide a streamlined construction, the housing 40 is made with molded and joinable upper and lower halves 80, 82, respectively. The upper housing half 80 is molded plastic with one piece that defines the boss 42 for anchoring the operating handle 14 and the projection 54. While preferred, a one piece construction is not required.

Figure 7:
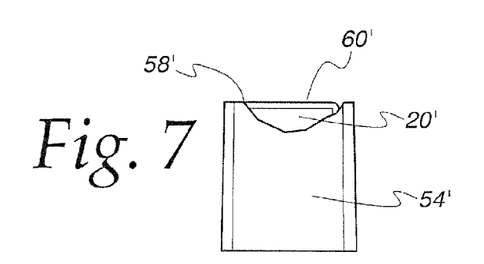
FIG. 7 is a partially broken away view as in FIG. 5 and showing a modified form of reset actuator with a surface thereon that is substantially flush with a surface of a projection with the reset actuator in the actuated position.

With one modification, as shown in FIG. 7, a reset actuator 20' is shown to have its top surface 60' flush with the first surface 58' on the projection 54' with the reset actuator 20' in an actuated position therefor. With this arrangement, the projection 54' functions also as a stop component, with the first surface 58' functioning as a blocking surface thereon. With this arrangement, the first surface 58' abuts to the bottom foot surface 56 so that excessive force cannot be applied thereby to the reset actuator 20' that might otherwise inflict damage thereto and/or upon components interacting between the reset actuator 20' and other components on the counter mechanism 18.

By reason of having the first surfaces 58, 58' extend fully around the reset actuators 20, 20', positive guiding of the reset actuator 20, 20' between retracted and actuated positions results. At the same time, with this first surface 58' functioning as the blocking surface, a stable surface of substantial area is presented to block downward movement of the user's foot 64. This fully surrounding construction for the surfaces 58, 58' is not required, however.

While preferably the reset actuators 20, 20' are designed to reposition along a vertical line, this is not a requirement. While the vertical arrangement facilitates resetting with the device 10 in the vertical or operating orientation, the inventive features could be incorporated whereby foot actuation may be carried out by repositioning the reset actuators 20, 20' along lines that may be horizontal or angled between horizontal and vertical.

Further linear movement of the reset actuators 20, 20' between retracted and actuated positions is not required. As but one example, a reset actuator that pivots under an applied force through a user's foot might perform in a like manner.

Figure 8:
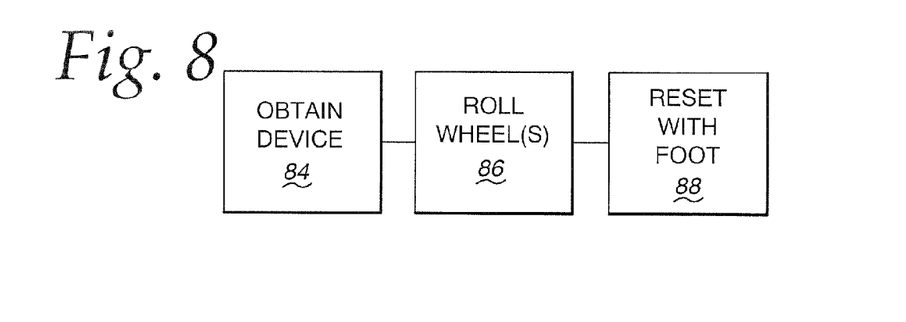
FIG. 8 is a flow diagram representation of a method of taking distance measurements according to the invention.

With the above structure, a user may take distance measurements on a surface in a manner shown in flow diagram form in FIG. 8. More specifically, as shown at block 84, a device, as described above, is obtained. As shown at block 86, at least one wheel on the device is placed, and rolled, against a surface to take a measurement. After the first distance measurement is taken, and with the wheel(s) against the surface, a user's foot is used to apply pressure against the reset actuator to reset the counter mechanism.

The foregoing disclosure of specific embodiments is intended to be illustrative of the broad concepts comprehended by the invention.

The invention claimed is:

1. A distance measuring device comprising:
a frame defining an operating handle;
at least one wheel mounted to the frame for turning around an axis;
a counter mechanism on the frame with a display and comprising a reset mechanism; and
an actuating mechanism comprising components cooperating between the at least one wheel and counter mechanism for causing cumulative distance measurements to be identified on the display as an incident of the at least one wheel being rolled against an underlying surface upon which a distance measurement is being taken,
the counter mechanism comprising a reset actuator that is moved from a retracted position into an actuated position through the application of a force thereon as by a user's foot to thereby reset the counter mechanism,
the reset actuator comprising a surface with an engaging area upon which a force is applied to change the reset mechanism from the retracted position into the actuated position;
the distance measuring device further comprising at least one stop component that defines a blocking surface to arrest movement of a component such as a user's foot having an area that is greater than the engaging area that is pressed against the surface of the reset actuator to thereby move the reset actuator from the retracted position into the actuated position.

2. The distance measuring device according to claim 1 wherein the at least one wheel defines the at least one stop component.

3. The distance measuring device according to claim 1 wherein the distance measuring device has a first surface that the surface of the reset actuator is moved towards and away from as the reset actuator is moved respectively towards the actuated position and towards the retracted position and with the reset actuator in the actuated position the surface of the reset actuator is spaced away from the first surface.

4. The distance measuring device according to claim 3 wherein the first surface is defined by a discrete projection.

5. The distance measuring device according to claim 4 wherein the first surface extends substantially fully around the surface of the reset actuator with the reset actuator in the actuated position.

6. The distance measuring device according to claim 4 wherein the reset actuator is movable in a line between the retracted and actuated positions, the at least one wheel defines the at least one stop component and the blocking surface on the at least one wheel and first surface reside in planes orthogonal to the line that are spaced by no more than ½ inch.

7. The distance measuring device according to claim 3 wherein the distance measuring device comprises a discrete projection with a free end defining the first surface.

8. The distance measuring device according to claim 7 wherein the discrete projection guides movement of the reset actuator between the retracted and actuated positions.

9. The distance measuring device according to claim 8 wherein there is a gap between the surface of the reset actuator and the one wheel that is bridged as by a user's foot applying a force to the reset actuator to move the reset actuator from the retracted position into the actuated position and the one wheel defines the at least one stop component.

10. The distance measuring device according to claim 8 wherein the reset actuator is movable in a first line between the retracted and actuated positions and the reset actuator is keyed within the discrete projection to limit relative movement between the reset actuator and discrete projection around the line.

11. The distance measuring device according to claim 7 wherein the counter mechanism comprises a housing and there is a single piece that defines a part of the housing including the discrete projection.

12. The distance measuring device according to claim 11 wherein the operating handle has an elongate body with an end that is anchored to the single piece.

13. The distance measuring device according to claim 1 wherein the at least one stop component comprises a projection with a free end defining the blocking surface.

14. The distance measuring device according to claim 1 wherein the reset actuator is translatable in a vertical line with the distance measuring device in an upright orientation.

15. The distance measuring device according to claim 1 wherein the at least one wheel comprises first and second wheels between which the counter mechanism is located.

16. The distance measuring device according to claim 1 wherein the engaging area on the reset actuator surface has at least one dimension on the order of ½ inch.

17. A distance measuring device comprising:
a frame defining an operating handle;
at least one wheel mounted to the frame for turning around an axis;
a counter mechanism on the frame with a display and comprising a reset mechanism; and
an actuating mechanism comprising components cooperating between the at least one wheel and counter mechanism for causing cumulative distance measurements to be identified on the display as an incident of the at least one wheel being rolled against an underlying surface upon which a distance measurement is being taken,
the counter mechanism comprising a reset actuator that is moved from a retracted position into an actuated position through the application of a force thereon as by a user's foot to thereby reset the counter mechanism,
the reset actuator comprising a surface with an engaging area upon which a force is applied to change the reset mechanism from the retracted position into the actuated position;
the distance measuring device further having a first surface that the surface of the reset actuator is moved towards and away from as the reset actuator is moved respectively towards the actuated position and towards the retracted position and with the reset actuator in the actuated position the surface of the reset actuator is spaced away from the first surface.

18. The distance measuring device according to claim 17 wherein the first surface is defined by a discrete projection.

19. The distance measuring device according to claim 18 wherein the discrete projection guides movement of the reset actuator between the retracted and actuated positions.

20. The distance measuring device according to claim 17 wherein the distance measuring device further comprises at least one stop component that defines a blocking surface to arrest movement of a component such as a user's foot having an area that is greater than the engaging area that is pressed against the surface of the reset actuator to thereby move the reset actuator from the retracted position into the actuated position.

21. A method of taking distance measurements on a surface, the method comprising the steps of:
obtaining a distance measuring device as in either of claims 1 and 17;
placing the at least one wheel against the surface;
through the operating handle rolling the wheel against the surface to take a first distance measurement that is displayed on the counter mechanism;
after taking the first distance measurement and with the at least one wheel against the surface, using a foot to apply a pressure against the reset actuator that changes the reset actuator from the retracted position into the actuated position to thereby reset the counter mechanism to allow another measurement to be taken.

* * * * *

UNITED STATES PATENT AND TRADEMARK OFFICE
CERTIFICATE OF CORRECTION

| | | |
|---|---|---|
| PATENT NO. | : 8,479,407 B2 | Page 1 of 1 |
| APPLICATION NO. | : 13/217954 | |
| DATED | : July 9, 2013 | |
| INVENTOR(S) | : Mark Nepil | |

It is certified that error appears in the above-identified patent and that said Letters Patent is hereby corrected as shown below:

On the Title Page:

Below Item (65) insert

-- Related U.S. Application Data (60) Provisional application No. 61/376,729 filed August 25, 2010. --

Signed and Sealed this
Eighth Day of October, 2013

Teresa Stanek Rea
*Deputy Director of the United States Patent and Trademark Office*